United States Patent Office 2,873,879
Patented Feb. 17, 1959

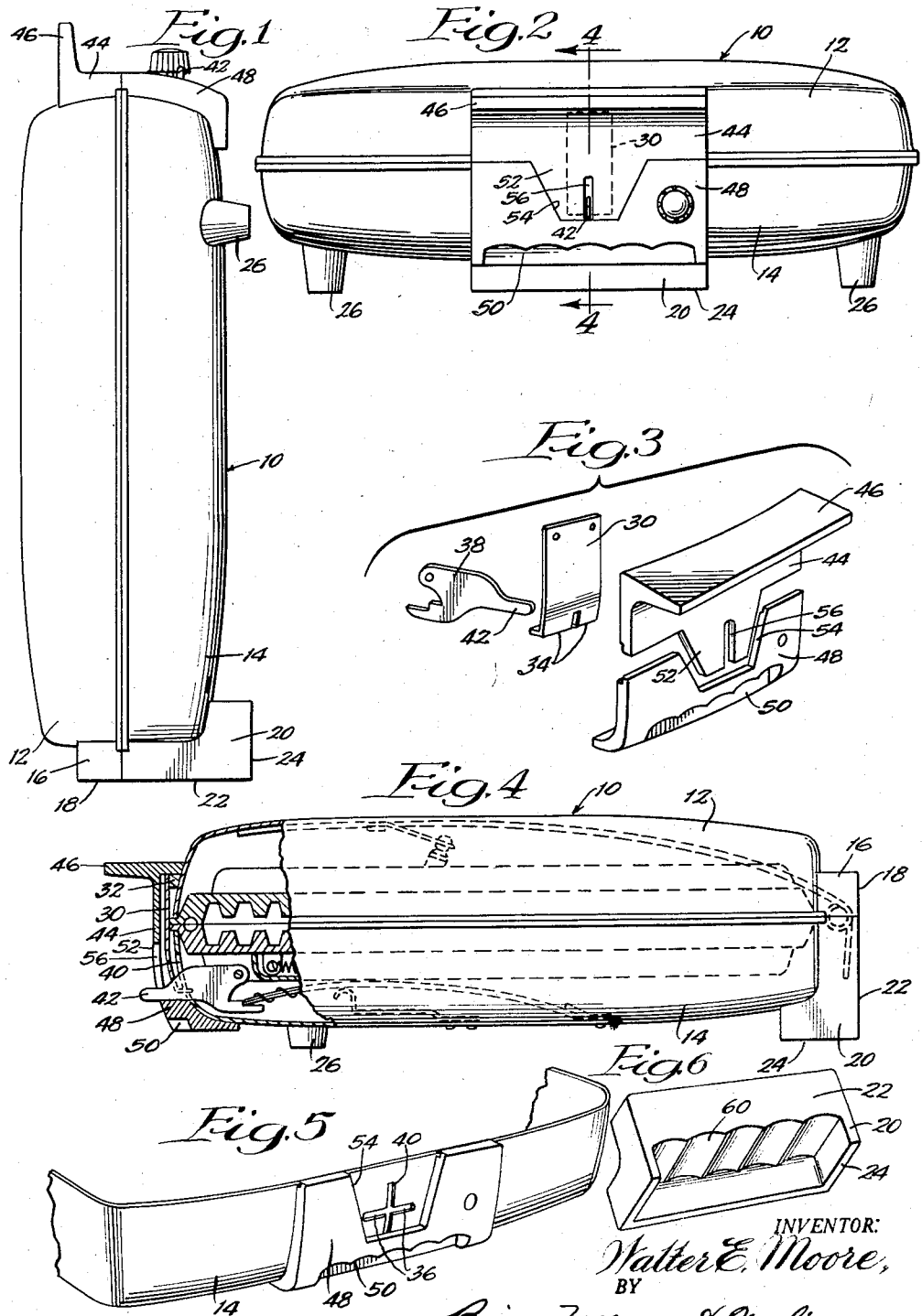

2,873,879

LATCH CONSTRUCTION FOR AN AUTOMATICALLY OPENING COOKING APPLIANCE

Walter E. Moore, St. Louis, Mo., assignor to Knapp-Monarch Company, St. Louis, Mo., a corporation of Delaware Application April 18, 1955, Serial No. 502,150

4 Claims. (Cl. 220—55.7)

This invention relates generally to a shell construction for an electrical cooking appliance, and more particularly to a novel shell construction for an automatic opening waffle iron.

The present invention is directed to the provision of an improved shell construction for an automatic opening waffle iron or similar cooking appliance of the type shown in co-pending Kueser application, Serial No. 473,699, having a common assignee with the present application. In order to insure efficient operation of an automatic opening appliance of the type having cooperating latch elements carried by the upper and lower shells of the appliance, the present invention contemplates novel means for providing accurate orientation and positive engagement of the latching means during closing of the cover shell into engagement with the base shell. This problem is of particular importance because of the substantial shifting movements permitted between the shells of a waffle iron appliance as a consequence of the expansible type of hinge which must necessarily be provided in order to permit normal rising of the batter during baking. Such hinges enable considerable shifting of the upper shell or cover relative to the lower shell or base, and as a consequence thereof the cooperating latch elements of the shells may be frequently misaligned to such an extent as to preclude proper latching engagement.

The present invention contemplates as its primary object, therefore, the provision of cooperatingly mated upper and lower handle brackets at the forward or opening end of a latchable appliance to insure accurate alignment of the shells relative to each other at all times during closing movement.

As a consequence of the inherent locked interengagement of the shell portions of a latchable appliance, and particularly an automatic opening cooking appliance of the type disclosed in the said Kueser application, it is possible to orient the entire appliance in any convenient manner for storage without the problem of opening separation of the shell portions.

It is another object of this invention, therefore, to provide upper and lower supporting brackets fixedly mounted at the rear ends of the appliance shells for permitting the entire appliance to be supported on its rear end for storage in a vertical position.

It is a further object of this invention to provide supporting legs at the forward end of the appliance cooperating with the lower supporting bracket at the rear end of the appliance to support the appliance in normally horizontal position for cooking operation.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which:

Figure 1 is a side elevational view showing an automatic opening waffle iron constructed in accordance with the present invention and oriented in a vertical position of end support for storage;

Figure 2 is an end elevational view of the appliance of Figure 1, oriented in horizontally supported position for normal cooking operation;

Figure 3 is a perspective, exploded view of the latch operating elements and cooperating bracket handles which effect shell alignment during closing movement;

Figure 4 is a side elevational view, partly in vertical cross section, taken substantially as indicated by the line 4—4 on Figure 2;

Figure 5 is a fragmentary perspective view of the lower appliance shell; and

Figure 6 is a perspective view of the lower rear bracket which provides supporting surfaces and manual gripping means.

Referring now more particularly to the drawing, I have shown an automatic opening waffle iron 10, constructed in accordance with the present invention and incorporating the operating features of the appliance disclosed in the said co-pending Kueser application. The appliance comprises an upper or cover shell 12 and a lower or base shell 14. The shells 12 and 14 are pivotally interconnected at the rear end of the appliance by an expansion hinge of the general type conventionally employed in waffle iron constructions.

The upper shell 12 mounts an upper bracket 16 at its rear end providing an end-supporting surface or leg 18. The lower shell 14 mounts a cooperating lower brackets 20 providing combined end and bottom-supporting surfaces or legs 22 and 24. The brackets 16 and 20 are rigidly secured to the respective shells 12 and 14, and serve to house the appliance expansion hinge therebetween. When the shells 12 and 14 are in closed engagement without the presence therebetween of an expanding batter volume, the brackets 16 and 20 are disposed in relatively close adjacent relation. Upon opening of the appliance, and pivotal separation of the cover shell 12 from the base shell 14, it will be understood that the expansible hinge connection therebetween permits sufficient separating movement between the adjacent surfaces of brackets 16 and 20 to allow easy pivotal turning of the upper bracket 16 relative to the stationary lower bracket 20.

A pair of forelegs 26 are fixedly secured to the undersurface of the lower shell 14 adjacent its forward end. The forelegs 26 are of a suitable height for cooperation with the bottom-supporting surface or legs 24 of the lower bracket 20 to provide co-planar points of bottom support for horizontally positioning the appliance on a supporting surface during normal cooking use.

As best seen in Figure 1, the end supporting surfaces or legs 18 and 22 of the upper and lower brackets 16 and 20, respectively, are generally co-planar to provide a uniform supporting surface for permitting the appliance to be supported on its rear end for storage in a vertical position. It will be apparent that the brackets 16 and 20 permit the appliance to be disposed with a minimum of occupied space width, thereby enabling compact and efficient storage of the appliance on its end in a kitchen cabinet or on a table surface.

The internal construction of the appliance 10 embodies the mechanical features disclosed and described in detail in the said co-pending Kueser application. The description of the present invention is restricted merely to those mechanical parts which directly cooperate with the novel shell construction herein disclosed.

A cover latch means 30, formed of a wide strip of spring metal, is rigidly secured along its upper edge to a mounting element 32 for connection with the forward end of the cover shell 12. The lower edge of the latch 30 is formed with a spaced pair of inwardly projecting, resilient latch prongs 34. The prongs 34 are urged by the normal spring resilience of the latch 30 into a cooperating horizontal slot or perforation 36 formed in the base shell 14 (see Figure 5).

It will be apparent that when the cover shell 12 is lowered into closed engagement with the base shell 14 in properly oriented relation therewith, the prongs 34 of the latch 30 will snap into the slot 36 and be resiliently biased therein so as to effect a locking of the cover shell 12 in closed position.

A latch release lever 38 is pivotally mounted within the lower shell 14 and extends forwardly through a vertical slot 40 in the shell 14 which intersects the horizontal slot 36 (see Figure 5). The lever 38 provides a projection 42 at its forward end which underlies the latch 30 intermediate its prongs 34. When pivoted upwardly by automatic operation of the appliance, in accordance with the automatic operation described in detail in the said co-pending Kueser application, the release lever 38 effects a bending of the latch 30 away from the shell 14 resulting in withdrawal of the prongs 34 from the horizontal slot 36. The upper shell 12 is then unlatched and may be freely pivoted upwardly away from the the lower shell 14.

An essential feature of this invention is the provision of guide means for insuring the alignment of the upper shell 12 directly above the lower shell 14 during closing movement. For this purpose, I provide an upper bracket 44 carried by the upper shell 12 at its forward end. The bracket 44 provides a handle extension 46 projecting forwardly therefrom. The lower shell 14 provides a lower bracket 48 for cooperation with the upper bracket 44. The lower bracket 48 provides a handle recess 50 at its lower edge.

The upper bracket 44 is formed with a downwardly extending guide projection 52 of tapered form. The lower bracket 48 is formed with a guide cut-away portion 54 which is matingly formed with inclined side edges for cooperation with the guide projection 52 of the upper bracket 44. As clearly seen in Figure 2, the guide projection 52 matingly nests within the guide cut-away 54 to effect accurate alignment of the shells 12 and 14 for locking in closed relation. It will be noted that the projection 52 is provided with a vertical slot 56 to permit the projection 42 of the latch release lever 38 to extend forwardly therethrough and to pivot upwardly for unlatching of the latch 30 thereby.

It will be apparent that as the cover shell 12 is lowered from an open position toward the base shell 14, the relatively small lower end of the tapered guide projection 52 will enter the relatively wide upper end of the cut-away portion 54 and move downwardly therein toward the relatively narrow lower end thereof. The upper bracket 44 will be guidingly directed into matingly nested engagement with the lower bracket 48 thereby accurately aligning the two shells 12 and 14 one above the other. In this way, the latch 30 will be properly positioned to insure entry of the prongs 34 into the horizontal slot 36 of shell 14. Latching engagement of the upper and lower shells 12 and 14 will thereby always be readily effected during closing of the appliance irrespective of sidewise shifting of the upper shell by movement about the expansion hinge.

The forward pair of handle brackets 44 and 48, and the rear pair of supporting backets 16 and 20, provide a novel shell construction for a latchable appliance which permits the cover shell to be properly aligned for effective latching during every closing operation, and which permits the entire appliance when latched to be vertically supported upon its rear end for compact storage in a novel manner.

The formation of the forward handle brackets 46 and 48, and the rear supporting brackets 16 and 20, constitutes an important feature of the present invention. The handle recess 50 of the lower forward bracket 48 and the extension 46 of the upper forward bracket 44 permit the front end of the appliance 10 to be readily grasped manually for carrying and other positioning movements, as desired. The lower rear bracket 20 is also provided with a handle recess 60 substantially in the manner of the recess 50 of the forward bracket 48. (See Figure 6.) It will be understood that the forward brackets 46, 48 and the rear brackets 16 and 20 are made of a suitable heat insulating material, preferably plastic, to permit manual gripping without risk of touching a relatively high temperature metal part during or immediately following baking operation of the appliance.

As shown in Figures 2 and 6, the recesses 50 and 60 of the brackets 48 and 20, respectively, provide a finger grip with convolutions or indentations at their upper wall surfaces to facilitate manual grasping and lifting of the appliance in an obvious manner.

The provision of handle grip means for the forward and rear brackets of the appliance serves to eliminate the necessity for conventional side carrying handles, thereby providing a unit of more compact construction and neater appearance. It will be apparent that the appliance may be readily grasped at its forward end, or at both its forward and rear ends, for movement or carrying in a convenient manner.

Changes may be made in the construction and arrangement of the parts of my Shell Construction for Automatic Opening Appliance without departing from the real spirit and purpose of my invention, and it is my intention to cover by the claims any modified forms of structure or use of mechanical improvements which may be reasonably included within their scope.

What I claim as new and desire to obtain by Letters Patent of the United States is:

1. An appliance for cooking or the like comprising a base, a cover cooperating with said base to define a cooking space therebetween, said cover being hingedly connected to said base and adapted to be positioned in relative closed engagement therewith during cooking operation of the appliance, cooperating latch elements including an inwardly flanged member carried by said cover and a flange-receiving slot formed on said base cooperating to retain said cover in closed engagement with said base when so positioned, a latch release member carried by the base and extending outwardly therefrom, said inwardly flanged member being bifurcated to receive therein said latch release member when the appliance is properly closed during a cooking operation, and a pair of guide brackets externally carried by said cover and said base respectively and having cooperatively mating portions operative independently of said latch elements for aligning said cover relative to said base and for aligning the bifurcated latch member with said latch release member during closing movement thereof, said guide brackets being so mounted as to effect full contacting engagement of said mating portions and to protectively overlie said latch elements when said base and cover are in closed engagement.

2. An appliance for cooking or the like comprising a base element, a cover element cooperating with said base element to define a cooking space therebetween, said cover being hingedly connected to said base and adapted to be positioned in relative closed engagement therewith during cooking operation of the appliance, cooperating latch elements carried by said cover and said base respectively and serving to retain said pair of elements in closed engagement, latch release means separate from said latch elements carried by one of said pair of elements and extending forwardly therefrom, said latch release means and the latch element carried on the other of said pair of elements having inter-cooperating portions which are aligned when the appliance is properly closed during a cooking operation, and a pair of guide brackets externally carried by said cover and said base respectively and having cooperatively mating portions operative independently of said latch elements for aligning said cover relative to said base during closing movement thereof, said guide brackets being so mounted as to protectively overlie said latch elements when said base and cover are in closed engagement, and one of said guide brackets being apertured for extension therethrough of said latch release means.

3. A device as set forth in claim 2 wherein said pair of guide brackets with cooperatively mating portions includes an upper guide bracket carried by the cover and having a downwardly tapered projection extending below the cover, and a lower guide bracket carried by the base having an upwardly enlarging cut-away portion shaped to receive, in matingly nested engagement, said tapered projection of the upper guide bracket.

4. A device as set forth in claim 2 including a first heat insulating grip means formed on said guide bracket carried by the base and located below the outwardly projecting latch release means, and a second heat insulating grip means carried by said base below the hinge connection of the cover to the base, said first and second grip means providing oppositely disposed means for carrying the appliance.

References Cited in the file of this patent

UNITED STATES PATENTS

| | | |
|---|---|---|
| 131,745 | Daggett | Oct. 1, 1872 |
| 252,577 | Gardner | Jan. 17, 1882 |
| 472,811 | Pickett et al. | Apr. 12, 1892 |
| 958,843 | Uhlyarik | May 24, 1910 |
| 1,335,484 | Cressey | Mar. 30, 1920 |
| 1,584,281 | Dumas | May 11, 1926 |
| 1,663,378 | Lebert | Mar. 20, 1928 |
| 1,754,800 | Preston | Apr. 15, 1930 |
| 1,873,104 | Benson | Aug. 23, 1932 |
| 1,947,232 | Smith | Feb. 13, 1934 |
| 2,711,684 | Taylor | June 28, 1955 |
| 2,720,332 | Holt | Oct. 11, 1955 |